UNITED STATES PATENT OFFICE.

EMILE THEODORE BUNDSMAN, OF POINT LOMA, CALIFORNIA, ASSIGNOR TO THE POINT LOMA CHEMICAL COMPANY, OF POINT LOMA, CALIFORNIA, A CORPORATION OF SOUTH DAKOTA.

SULFUR COLOR AND PROCESS OF MAKING SAME.

No. 909,277.       Specification of Letters Patent.       Patented Jan. 12, 1909.

Application filed October 7, 1905. Serial No. 281,762.

*To all whom it may concern:*

Be it known that I, EMILE THEODORE BUNDSMAN, a citizen of the United States, residing at Point Loma, San Diego county, in the State of California, have invented a new and useful Improvement in Coloring-Matters and Processes of Making the Same, of which the following is a specification.

I have discovered that the members of the group of chemicals known as the sugars may be used in combination with other chemicals to produce coloring matters.

The sugars will, when sulfurized by any of the sulfuring agents of the arts, in combination with such other chemicals as can themselves be sulfurized to form colors, produce valuable and new coloring matters. These coloring matters possess properties which are usually markedly different from those possessed by coloring matters produced by sulfuring the other color-forming chemicals alone, or by mechanically mixing the products of the separate sulfurization. It is evident, therefore, that by the sulfuring of a mixture of a sugar with another color-forming chemical new sulfur coloring matters are produced. The sugars may therefore be said to play the part of "co-bases". These new co-bases may be sulfured in connection with an unlimited number of other color-forming chemicals, and in each instance a new coloring matter obtained; they seem, therefore, to be universal in their application, and to be properly designated as "universal co-bases". They seem to occupy a unique position in the manufacture of coloring matters, no other color base having as yet been found to have similar universal applicability. New and valuable coloring matters may furthermore be produced by sulfuring the sugars in connection with other chemicals which, while belonging to the same groups as those already described and having many analogies to such chemicals, do not in themselves possess similar color-forming properties: for example, by sulfuring the sugars in combination with aromatic chemicals which will not, with sulfuring agents alone, produce coloring matters. The sugars, therefore, seem to give color-forming properties to such non-color forming chemicals. I have caused experiments to be made with a number of non-color forming aromatic chemicals, and, in each instance, a new coloring matter has been produced. The sugars occupy a unique position in the art in this respect. To sum up: I have discovered that the sugars may be used in connection with other color-forming chemicals as co-bases, and that they impart color-forming properties to still other chemicals.

I find that the best results, commercially and technically, are given by the use of grape sugar, although the other sugars, as glucose or cane sugar, give excellent results.

The following examples will serve to illustrate the manner in which coloring matters may be produced from the sugars in combination with other chemicals.

*Example I. A sugar used as a co-basis, in connection with a color-forming chemical.—* Weigh out into a suitable crucible: 8 parts grape sugar, 12 parts sulfur, 60 parts sodium sulfid crystals. Apply heat and raise the temperature to 120° C. After one hour at this temperature, dissolve in water, cool, and add 6 parts of meta-nitranilin. Raise the heat to drive off the water. Then raise the temperature gradually but steadily to 250°–300° C. and heat until a dry mass is formed, which can be readily pulverized, and until a dyeing test shows that the full tinctorial power has been developed. The process takes from seven to eight hours in all. The full tinctorial power of the color is best developed by this process, although a similar color will be produced when the meta-nitranilin is added in the beginning.

The substance obtained by this process is soluble in cold water, cold sodium carbonate solution, alcohol and caustic alkaline solution, and dyes unmordanted cotton a fast bright yellowish brown shade in the usual alkaline salt bath, with or without the addition of sodium sulfid. The color may also be concentrated in the usual manner by precipitation with hydrochloric acid, the resulting substance being insoluble in cold water, cold sodium carbonate solution, alcohol, and concentrated sulfuric acid, slowly soluble in caustic alkaline solution, and readily soluble in cold sodium sulfid solution. It dyes unmordanted cotton a fast, bright yellowish brown shade, in an alkaline salt bath with the assistance of sodium sulfid. When identically the same operation is performed without the grape sugar, a dull greenish black alone is formed.

This example illustrates a great number of syntheses of coloring matters that can be performed by the use of these universal co-bases in combination with other chemicals which are themselves color bases. Thus, by substituting for meta-nitranilin either meta-phenylene diamin base or meta-dinitro benzene, in the above formula, browns will be formed somewhat similar to the brown obtained from meta-nitranilin. By using para-nitrophenol a darker yellow brown is obtained. Bi-nitrochlorbenzol yields a valuable medium brown. 1.8 dinitro-naphthalene yields a valuable black.

Variations of temperature will produce a variation in the shade of the product. By varying the proportions of the ingredients other variations in color can be produced.

*Example II. A sugar used to impart color-forming properties to a chemical which, under similar circumstances and conditions, is not a color-former.*—Weigh out into a suitable crucible: 8 parts grape sugar, 12 parts sulfur, 60 parts sodium sulfid crystals. Apply heat and raise the temperature to 120° C. After one hour at this temperature dissolve in water, cool, and add 6 parts of sodium salt of sulfanilic acid. Raise the heat to drive off the water, then raise the heat gradually but steadily to 150°–180° C., and heat until a dry powder is formed, or a dyeing test of the fusion shows that the color has been fully formed.

The above process gives the best result, although a similar result is obtained by adding the sodium salt of sulfanilic acid in the beginning. The resulting substance is soluble in cold water, cold sodium carbonate solution, alcohol, and caustic alkaline solution, and dyes unmordanted cotton a fast medium brown in a salt bath made alkaline with soda, with or without the addition of sodium sulfid. It may also be concentrated in the usual manner by precipitation with hydrochloric acid, in which case the resulting substance will be insoluble in cold water, cold sodium carbonate solution, alcohol, and concentrated sulfuric acid, slowly soluble in caustic alkaline solution and readily soluble in cold sodium sulfid solution. It will dye unmordanted cotton a fast medium brown in the usual alkaline salt bath, with the assistance of sodium sulfid.

Variations of temperature will produce a variation in the shade of the product. By varying the proportions of the ingredients other variations in color can be produced.

When the same operation is performed without the grape sugar, no color is formed.

This example illustrates a great number of syntheses of coloring matters that can be performed by the use of these universal color formers. Thus by substituting for the sodium salt of sulfanilic acid in the above formula, either anilin salts, benzidin, or diphenylamin, chemicals which are not color formers, other and new colors will be produced, such as dark red with anilin salts, olive green with benzidin, and dark green with diphenylamin. These colors I have yet to perfect.

The primal simplicity of constitution of these non-color forming chemicals to which my color formers impart color forming properties serves to illustrate and emphasize the unique and important position of the sugars in the manufacture of coloring matters.

I find that very satisfactory results are given by the combination of the sugars with members of the so-called group of aromatic chemicals. Coloring matters have been produced by the sulfuring of grape sugar in combination with a number of aromatic chemicals, both of those having color-forming properties when sulfured, and those not possessing color forming properties under the same treatment. The examples above referred to all involve the use of an aromatic chemical. While the sugars in combination with many chemicals will produce coloring matters, they are particularly suited to form coloring matters in combination with such aromatic chemicals.

I claim as my invention:

1. The process of making sulfur dyes consisting in heating a mixture of a sugar, a color-forming aromatic chemical, and a sulfuring agent.

2. The process of making sulfur dyes, consisting in heating grape sugar, a color-forming aromatic chemical, and a sulfuring agent.

3. The process of making a sulfur dye, consisting in heating a mixture of sugar, meta-nitranilin, and a sulfuring agent, substantially as described.

4. The process of making a sulfur dye, consisting in heating a mixture of grape sugar, meta-nitranilin, and a sulfuring agent, substantially as described.

5. As a new article of manufacture, the coloring matter which can be made from grape sugar and meta-nitranilin, substantially as described, which is soluble in cold water, cold sodium carbonate solution, alcohol and caustic alkaline solution, and which dyes cotton in alkaline salt bath, fast brown shades.

6. As a new article of manufacture, the coloring matter which is precipitated by hydrochloric acid from a solution of the coloring matter made from grape sugar and meta-nitranilin, substantially as described, which is insoluble in cold water, cold sodium carbonate solution, alcohol, and concentrated sulfuric acid, which is slowly soluble in caustic alkaline solution, which is readily soluble in cold sodium sulfid solution, and dyes cotton from an alkaline salt bath with the assistance of sodium sulfid, fast brown shades.

In testimony whereof, I have hereunto signed my name in the presence of two subscribing witnesses.

EMILE THEODORE BUNDSMAN.

Witnesses:
C. THURSTON,
G. DE PURUCKER.